April 18, 1967 J. CLAUS 3,314,755
CONTINUOUS PROCESS FOR EXTRACTING ANHYDROUS HYDROGEN
FLUORIDE FROM AQUEOUS HYDROFLUORIC ACID
Filed Dec. 11, 1963
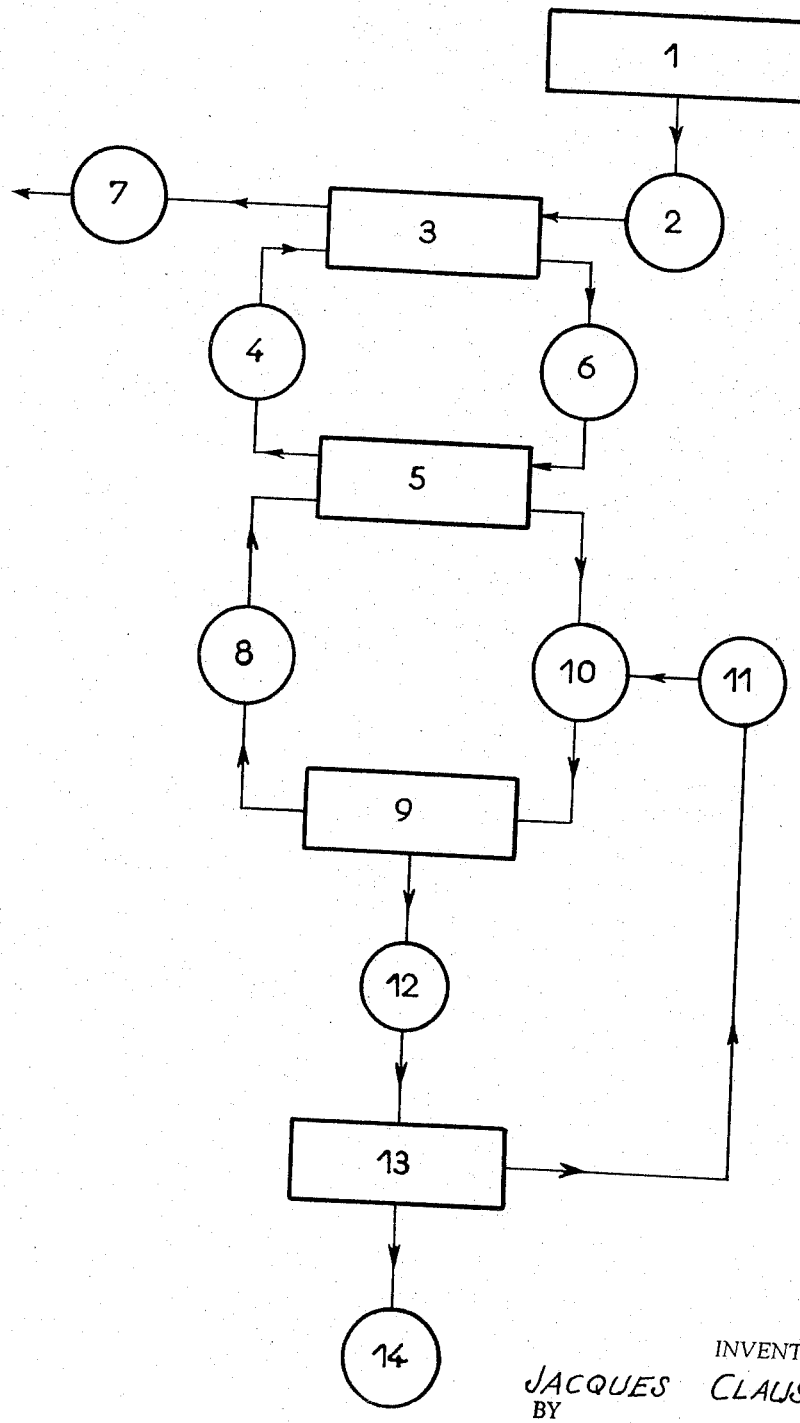
INVENTOR.
JACQUES CLAUS
BY
Ooms, McDougall & Hersh ATTYS.

3,314,755
CONTINUOUS PROCESS FOR EXTRACTING ANHYDROUS HYDROGEN FLUORIDE FROM AQUEOUS HYDROFLUORIC ACID
Jacques Claus, Saint-Gratien, Seine-et-Oise, France, assignor to Produits Chimiques Pechiney-Saint-Gobain, Neuilly (Seine), France
Filed Dec. 11, 1963, Ser. No. 329,697
Claims priority, application France, Dec. 17, 1962, 918,778
12 Claims. (Cl. 23—153)

This invention relates to a process for the extraction of anhydrous hydrofluoric acid (HF) from aqueous hydrofluoric acid solutions and relates more particularly to a continuous process for the recovery of hydrofluoride from solutions thereof in water.

Usually extraction of hydrofluoride from its aqueous hydrofluoride solutions cannot be carried out successfully by distillation procedure because of the existence of an azeotrope which boils off as a constant boiling solution containing 38 percent hydrofluoride.

It has been necessary to work, in accordance with a well-known procedure, to effect a preliminary extraction by an exchange process which makes use of an element from which it is possible to effect a further separation of hydrofluoride by any possible means. For this purpose, it has been proposed to make use of inorganic elements which are insoluble in water and which have an amine function, thereafter separating the hydrofluoride from the amine by distillation. The amines that have been used, have a high boiling point to enable good separation of the hydrofluoride in a distillation column and such distillation has been carried out in the absence of oxygen. This process, however, is incapable of use successfully in the treatment of solutions containing less than one percent hydrofluoride such that this process is limited in use for the recovery of hydrofluoride contained in aqueous solutions in relatively high concentrations. The process is also subject to other drawbacks, such as the instability of the amine when heated to elevated temperature and instability of some of the solvents with which it is sometimes necessary to mix with the amine.

It has also been suggested to extract hydrofluoride into hydrocarbons in the form of the bifluoride, using alkali fluoride tablets, but it is difficult to adapt this technique to a continuous cycle of separations.

Thus, it is an object of this invention to provide a process for the extraction of hydrofluoride from anhydrous hydrofluoric acid solutions, wherein the process is capable of continuous operation, by a process which is efficient and safe, by a process in which recovery can be made from solutions containing less than one percent by weight of hydrofluoride and it is a related object to provide a process of the type described which is efficient and low-cost and which makes efficient use of low cost and readily available materials.

These and other objects and advantages of this invention will hereinafter appear and for purposes of illustration but not of limitation, an embodiment of the invention is shown in the accompanying drawing in which:

The sole figure is a flow sheet illustrating the practice of this invention.

In accordance with the practice of this invention, hydrofluoride is extracted from its aqueous hydrofluoric acid solution by means of an amine, which is insoluble in water and which may be used with or without solution in a solvent in a first extraction step. The hydrofluoride extracted with the amine or in the solution of the amine is subjected to a second extraction step with a concentrated solution of an alkali fluoride, whereafter the extractor rich in hydrofluoride is treated with an additional amount of the same alkali fluoride added in an undissolved state to the mixture to cause crystallization of the formed alkali bifluoride. The crystallized alkali bifluoride is separated, dried and calcined to release the anhydrous hydrofluoride, leaving a dry alkali fluoride as a residue. The dry alkali fluoride that remains is recycled into the system for the formation of alkali bifluoride and the solution of alkali fluoride which remains after crystallization of the alkali bifluoride is recycled to the second extraction step. Similarly, the inorganic phase comprising the effluent from the second extraction step and still containing some hydrofluoride is recycled for use as the extraction medium in the first extraction step.

In comparison with the process of distillation, the extraction of hydrofluoride from its aqueous hydrofluoric acid solution in the amine or amine-solvent system and the subsequent extraction thereof in the solution of alkali fluoride does not result in decomposition, in whole or in part, of the amine and/or the solvent and the described process results in a high rate of extraction of the type suitable for commercial practice. The effluent from the first extraction will have the hydrofluoride content reduced to a value as low as 0.1 percent by weight. The following example of the practice of this invention gives the values in percent by weight obtained in a continuous commercial operation and which is illustrated by the flow sheet which shows schematically the various steps of the process.

In the flow sheet, the numeral 1 indicates a storage vessel for the solution of hydrofluoric acid to be treated containing one percent HF. The numeral 3 illustrates a first extraction vessel and the numeral 5 illustrates a second extraction vessel in which, in the commercial reduction to practice, the first extractor 3 is a two-stage extractor and the second extractor 5 is a three-stage unit. The precipitation vessel is illustrated by the numeral 9 and the calcination furnace is illustrated by the numeral 13. In the illustrated modification, the first extraction in 3 is carried out at about ambient temperature while the second extraction is carried out at a temperature about 50° C. For the crystallization in chamber 9, the materials are cooled to about 0° C. and for calcination the bifluoride is heated to a temperature of about 500° C.

The hydrofluoric acid solution 2 is fed from the reservoir 1 into one end of the extractor 3 and the effluent 7 is withdrawn from the other end of the extractor. Wherein the effluent 4 from the second extractor 5 is recycled to the opposite end of the first extractor 3. For passage in contacting relationship with the hydrofluoric acid solution 2 to effect extraction of HF from the feed and the solution 6 containing the higher concentration of HF is withdrawn from the feed end of the extractor 3 for use as feed introduced into the end of the second extractor 5.

The solution 8 remaining after crystallization of the bifluoride in the crystallization chamber 9 is recycled to the other end portion of the second extractor 5 for passage in extractive relation with the feed 6 from the first extractor 3 and the solution 10 issuing from the extractor 5 is advanced to the crystallizer 9.

Advanced to the calcinator 13 where the bifluoride is broken down into anhydrous hydrofluoric acid (HF) 14 as the product while the residue of a dialkali fluoride 11 is returned for additions to the fluid 10 to form the difluoride to be crystallized in the crystallizer 9.

In the illustrated modification, the liquid 2 to be treated, and which contains one percent HF is fed at room temperature to the extractor 3 in an amount corresponding to 110 kg. The effluent 7 remaining after HF has been extracted by the amine solution will contain about 0.1 percent HF.

The extracting liquid 4 recycled from the second extractor 5 to the first extractor 3 in an amount corresponding to the 24.5 kg. contains one volume of secondary laurylamine, industrial grade (Amberlite LA2), having a molecular weight in the range of 350 to 400, a density of about 0.8 and one volume of hydrocarbon solvent (Solvesso 100) and about 1.5 percent HF.

The inorganic solution 6 issuing from the outlet of the first extractor 3 will contain about 5.3 percent HF.

The aqueous solution 8 recycled from the crystallizer 9 to the second extractor 5, in an amount corresponding to 22.1 kg., contains about 30 percent by weight potassium fluoride in solution and about 0.75 percent HF.

The inorganic solution 4 is reduced to a HF content of 1.5 percent when the aqueous solution 10 leaving the second extractor 5 contains about 5.1 percent HF.

2.9 kg. of dry potassium fluoride 11 is added to the solution 10 and the mixture is advanced to the crystallizer-separator and cooled to 0° C. to precipitate potassium bifluoride.

The potassium bifluoride 12 separated from the crystallizer 9 is advanced to the calcinator 13. The solution 8 remaining after crystallization of the potassium bifluoride in the crystallizer 9 contains about 0.75 percent HF and is recycled to the effluent end portion of the second extractor 5.

The potassium bifluoride crystals 12 obtained in an amount corresponding to 4.25 kg. and containing 23.5 percent HF is calcined at 500° C. to release dry hydrofluoride 14 as a gas and dry solid potassium fluoride 11 which is recycled, as needed, to the solution 10. The yield of dry hydrofluoride is 1 kg. and this corresponds to a yield of about 91 percent.

The preceding example is given by way of illustration, but not by way of limitation. In the example, the secondary laurylamine is merely representative of various water insoluble organic amines which can be used, as represented by trialkylmethylamine (Primene JM-T), N-dodecenyl (trialkylmethyl)amine (Amberlite LA-1), bis(1-isobutyl-3,5-dimethylhexyl)amine (Amine S-24), trilaurylamine, tri-n-octylamine, tri-iso-octylamine, tri-isononylamine and didodecenyl-n-butylamine (Amberlite XE-204).

Instead of potassium fluoride, other alkali metal fluorides can be used such as sodium fluoride, lithium fluoride and the like, but an excellent level of extraction is achieved by the use of potassium fluoride when operating between the two temperatures of 50° C. and 0° C. although other related temperatures may be employed.

Each of the extractors 3 and 5 can be selected to have one or multiple stages, such as the two-stages of extractor 3 and the three-stages in extractor 5. The higher the number of stages, the higher the extraction rate and yield, but the amount of stages will be limited by practical commercial considerations, such as the formation of difficult emulsions in the first extractor 3 if the effluent from the extractor has less than 0.1 percent HF. This limits the volume of the inorganic solution and the number of stages which can practically be used.

It will be apparent that the process which is applicable to the extraction of hydrofluoride from solutions containing less than one percent HF can also be used in the extraction of hydrofluoride from solutions containing higher concentrations of HF. In the treatment of solutions having an amount of HF in excess of the 38 percent azetrope, it is desirable first to effect a preliminary separation of the excess hydrofluoride by distillation.

It will be apparent from the foregoing that I have provided a simple and safe means capable of low cost and efficient continuous operation for the extraction of HF from its aqueous hydrofluoric acid solutions.

It will be understood that changes may be made in the details of formulations, temperature and pressure conditions without departing from the spirit of the invention, especially as defined in the following claims.

What is claimed is:

1. In the method of recovering hydrogen fluoride from aqueous solutions containing the hydrogen fluoride in low concentration by the process which includes the steps of adding solid alkali metal fluoride to an aqueous solution containing hydrogen fluoride in substantial concentration, cooling the alkali metal fluoride—aqueous solution of hydrogen fluoride to precipitate the corresponding alkali metal bifluoride, separating the alkali metal bifluoride, and calcining the separated alkali metal bifluoride to release hydrogen fluoride as a gas and alkali metal fluoride as a solid, the improvement in providing a more concentrated solution of hydrogen fluoride to which the alkali metal fluoride is added comprising the steps of contacting the aqueous solution containing the hydrogen fluoride in low concentration in a first extraction step with an organic amine that is immiscible with water to extract hydrogen fluoride from the aqueous hydrogen fluoride solution, contacting the amine containing the extracted hydrogen fluoride in a second extraction step with an aqueous solution of alkali metal fluoride to extract hydrogen fluoride from the amine, and adding the alkali metal fluoride to the aqueous solution of alkali metal fluoride containing the extracted hydrogen fluoride.

2. The method as claimed in claim 1 in which the aqueous hydrogen fluoride solution from which the hydrogen fluoride is recovered contains less than 1% by weight hydrogen fluoride.

3. The method as claimed in claim 1 in which the first extraction step is carried out at a temperature within the range of 20° C. to 100° C.

4. The method as claimed in claim 1 in which the amine employed in the first extraction step is admixed with a solvent that is immiscible with water.

5. The method as claimed in claim 1 in which the amine is mixed to the hydrofluoric acid solution in a ratio within the range of 1 per 100 to 4 per 1 by weight.

6. The method as claimed in claim 1 in which the second extraction step is carried out at a temperature within the range of 20° C. to 100° C.

7. The method as claimed in claim 1 in which the alkali metal fluoride in the extraction liquid of the second extraction step is present in solution in an amount within the range of 10 to 60 percent by weight.

8. The method as claimed in claim 1 in which the effluent from the second extraction step is recycled as the extraction medium to the first extraction step.

9. The method as claimed in claim 1 in which the alkali metal fluoride is added to the solution in an amount to raise the concentration of alkali metal fluoride in the system to within the range of 10 to 60 percent by weight.

10. The method as claimed in claim 1 in which the mixture is cooled to a temperature within the range of −5° C. to 90° C. for crystallization of the alkali metal bifluoride.

11. The method as claimed in claim 1 in which the remainder from the crystallization step is recycled to form at least a part of the extraction medium of the second extraction step.

12. The method as claimed in claim 1 in which the alkali metal fluoride remaining after calcination is recycled for addition to the alkali metal fluoride solution enriched with hydrogen fluoride from the second extraction step.

References Cited by the Examiner

UNITED STATES PATENTS

| | | | |
|---|---|---|---|
| 2,388,156 | 10/1945 | Kelley | 23—153 X |
| 2,400,874 | 5/1946 | Burk | 23—153 |
| 2,400,875 | 5/1946 | Hughes et al. | 23—153 |
| 2,588,786 | 3/1952 | Winter | 23—153 |
| 3,087,787 | 4/1963 | Flemmert | 23—153 |
| 3,140,152 | 7/1964 | Rucker | 23—153 |

OSCAR R. VERTIZ, *Primary Examiner.*

EDWARD STERN, *Examiner.*